United States Patent [19]

Havens

[11] Patent Number: 4,732,727
[45] Date of Patent: Mar. 22, 1988

[54] METHOD AND APPARATUS FOR PRODUCING MESH FILM

[75] Inventor: Carl B. Havens, Newark, Ohio

[73] Assignee: The Dow Chemical Company, Midland, Mich.

[21] Appl. No.: 848,010

[22] Filed: Apr. 3, 9186

[51] Int. Cl.[4] .................. B29C 47/20; B29C 47/90
[52] U.S. Cl. ........................ 264/519; 264/565; 264/569; 264/177.19; 425/72 R; 425/326.1; 425/72.1
[58] Field of Search ........... 264/565, 519, 569, 177.19; 425/72 R, 326.1

[56] References Cited

U.S. PATENT DOCUMENTS

| | | | |
|---|---|---|---|
| 2,987,767 | 6/1961 | Berry et al. | 264/566 |
| 3,140,330 | 7/1964 | Gutierrez | 425/393 |
| 3,399,262 | 8/1968 | Quackenbush et al. | 425/392 |
| 3,488,809 | 1/1970 | James | 264/564 |
| 3,762,853 | 10/1973 | Upmeier | 425/326.1 |
| 3,810,725 | 5/1974 | Trub et al. | 425/326.1 |
| 3,950,466 | 4/1976 | Hasler | 425/72 R |
| 3,976,733 | 8/1976 | Havens | 425/72 R |
| 4,115,048 | 9/1978 | Alderfer et al. | 425/72 R |
| 4,176,155 | 11/1979 | Heisterkamp et al. | 264/564 |
| 4,265,853 | 5/1981 | Havens | 264/519 |
| 4,315,963 | 2/1982 | Havens | 264/519 |
| 4,443,400 | 4/1984 | Herrington | 264/519 |
| 4,472,343 | 9/1984 | Kawamura et al. | 264/565 |

FOREIGN PATENT DOCUMENTS

| | | | |
|---|---|---|---|
| 2132098 | 1/1973 | Fed. Rep. of Germany | 425/326.1 |
| 56-37122 | 4/1981 | Japan | 264/519 |
| 58-179620 | 10/1983 | Japan | 264/519 |

Primary Examiner—Jeffery Thurlow
Attorney, Agent, or Firm—L. E. Hessenaur, Jr.

[57] ABSTRACT

A method and apparatus for producing mesh film include an extrusion die for extruding a tube of a heat-plastified, resinous, mesh film material. A first cooling arrangement, centrally located within the extruded tube, cools the internal surface of the tube. The first cooling arrangement has an outer diameter substantially equal to the inner diameter of the extruded tube. A plurality of cooling nozzles are disposed radially outward from the first cooling arrangement for directing a plurality of streams of a cooling gas toward the exterior surface of the extruded tube. An annular gas bearing is spaced axially from the first cooling arrangement such that the extruded tube passes therethrough after leaving the first cooling arrangement, thereby permitting the diameter of the extruded tube to be increased subsequently by means of a trapped air bubble therewithin.

20 Claims, 3 Drawing Figures

METHOD AND APPARATUS FOR PRODUCING MESH FILM

BACKGROUND OF THE INVENTION

The present invention relates to a method and apparatus for producing a tube of a heat-plastified, resinous, mesh film material and, more particularly, to such a method and apparatus in which various tube diameters may be produced, in an improved manner, with the same method and apparatus.

A number of different techniques have been used to form extrudable, synthetic, resinous, thermoplastic compositions into film. Such film finds utility in numerous applications, such as for example as wrapping material, in garbage bags, and the like. It is known that the tear resistance of such film may be increased significantly by incorporating ridges of increased film thickness in the film, producing a product sometimes referred to as mesh film. The ridges may be configured in various patterns, including parallel stripes, criss-cross patterns, and combinations thereof.

U.S. Pat. No. 4,265,853, issued May 5, 1981, to Havens, discloses apparatus for producing a ridge pattern in extruded film by differential cooling of the film during a stretching process. The film is extruded through a tubular die and stretched as it leaves the die. A plurality of nozzles, spaced around the tubular film. rotate around the film as it is stretched, cooling the film to produce a plurality of narrow strips of increased thickness, and achieving a sharply defined ridge effect. A criss-cross pattern of ridges may be obtained by using two sets of nozzles which are rotated around the film in opposite directions. In the Havens U.S. Pat. No. 4,265,853 apparatus, the tubular film passes around the outside surface of a cylindrical cooling mandrel after it is enlarged to its desired diameter. Thereafter, the tubular film is split into two strips of film which are collected for further processing. While providing a reinforced film product of high quality, the Havens U.S. Pat. No. 4,265,853 apparatus is limited in that it is capable of producing tubular film of only a specific diameter. It is seen, therefore, that a need exists for a method and apparatus for making mesh film of various selected diameters without changing the apparatus.

SUMMARY OF THE INVENTION

This need is met by apparatus according to the present invention for producing a mesh film which includes extrusion die means for extruding a tube of a heat-plastified, resinous, mesh film material, and first cooling means, centrally located within the extruded tube, for cooling the internal surface of the tube. The first cooling means has an outer diameter substantially equal to the inner diameter of the extruded tube. A plurality of cooling nozzles, disposed radially outward from the first cooling means, direct a plurality of streams of cooling gas toward the exterior surface of the extruded tube. An annular gas bearing is spaced axially from the first cooling means such that the extruded tube passes therethrough after leaving the first cooling means. This permits the diameter of the extruded tube to be increased subsequently by means of a trapped air bubble therewithin.

The first cooling means may comprise a generally cylindrical cooled mandrel, and a pair of generally cylindrical gas bearings, positioned on either side of the mandrel and axially aligned therewith. Alternatively, the first cooling means may comprise a generally cylindrical gas bearing. At least some of the plurality of cooling nozzles may be movable circumferentially around the extruded tube.

The apparatus may further comprise second cooling means for cooling the tube after it passes through the annular gas bearing, as the diameter of the tube is enlarged. The second cooling means may comprise means for directing a cooling gas against the exterior surface of the extruded tube.

The apparatus may further comprise third cooling means for cooling the tube as it emerges from the die means. The third cooling means may comprise means for directing a cooling gas against the exterior surface of the extruded tube immediately after it emerges from the die means.

The apparatus may further comprise fourth cooling means, centrally located within the extruded tube, for cooling the internal surface of the tube after the tube emerges from the annular gas bearing. The exterior diameter of the fourth cooling means may be substantially greater than the interior diameter of the annular gas bearing. The fourth cooling means may comprise a cooled mandrel, and a gas bearing associated therewith.

The extrusion die means may comprise an extrusion die for extruding a relatively large diameter tube of a heat-plastified, resinous, mesh film material, and a second annular gas bearing. The second annular gas bearing is positioned adjacent the die and is coaxially aligned therewith for receiving the tube therethrough from the extrusion die. The second annular gas bearing has an inner diameter which is less than the diameter of the tube as it leaves the die and which is substantially equal to the outer diameter of the first cooling means.

The method for producing the mesh film according to the present invention includes the steps of:
(a) extruding a heat-plastified, resinous, mesh film material to form a tube of mesh film material;
(b) passing the tube of mesh film material over a centrally located generally cylindrical cooling means to cool the interior surface of the tube while directing a plurality of streams of cooling gas toward the exterior surface of the tube;
(c) thereafter, passing the tube through an annular gas bearing having an inner diameter approximately equal to the outer diameter of the cooling means; and
(d) thereafter, increasing the diameter of the tube by means of a trapped air bubble therewithin.

The cooling means may comprise a generally cylindrical cooled mandrel, and a pair of generally cylindrical gas bearings positioned on either side of the mandrel and axially aligned therewith. Alternatively, the cooling means may comprise a generally cylindrical gas bearing. At least some of the streams of cooling gas may be moved circumferentially around the extruded tube.

The method may further include the step of cooling the tube, as its diameter is increased, by directing a cooling gas against its exterior surface. The method may further include the step of cooling the tube, immediately after it is extruded, by directing a cooling gas against its exterior surface. Furthermore, the method may further comprise the step of cooling the tube, after its diameter is increased, by means of a cooled mandrel, and a gas bearing associated therewith positioned within the tube.

The step of extruding a heat-plastified, resinous, mesh film material to form a tube of mesh film material may comprise the steps of extruding a relatively large diameter tube of a heat-plastified, resinous, mesh film material, and reducing the diameter of the relatively large diameter tube by stretching the tube axially.

Accordingly, it is an object of the present invention to provide a method and apparatus for producing mesh film which is capable of providing such film as extruded tubes of various diameters; to provide such a method and apparatus in which the tube passes around a cooling means having an outer diameter substantially equal to the inner diameter of the tube with a plurality of cooling nozzles disposed radially outward from the cooling means, and in which the tube thereafter passes through an annular gas bearing to facilitate subsequent enlargement of the tube by means of a trapped air bubble; to provide such a method and apparatus in which the cooling means includes a generally cylindrical cooled mandrel and a pair of generally cylindrical gas bearings positioned on either side of the mandrel and axially aligned therewith; to provide such a method and apparatus in which a further cooling means is centrally located within the extruded tube for cooling the interior surface of the tube after the tube emerges from the annular gas bearing; to provide such a method and apparatus in which the extrusion die extrudes a relatively large diameter tube and in which a second annular gas bearing receives the tube from the extrusion die to reduce the diameter of the tube to approximately that of the cooling means; and to provide such a method and apparatus in which additional cooling may be provided at various points along the path of the extruded tube.

Other objects and advantages of the invention will be apparent from the following description, the accompanying drawings and the appended claims.

DETAILED DESCRIPTION OF THE PREFERRED EMBODIMENTS

Figure 1:
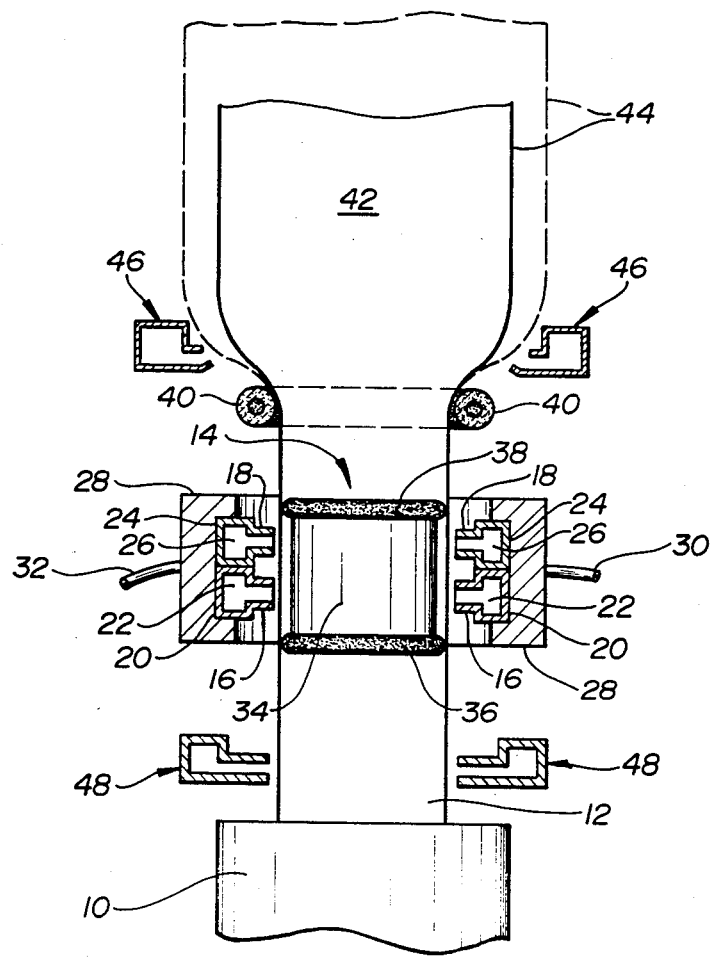
FIG. 1 is a side view of a first embodiment of the present invention, with portions broken away and in section.

FIG. 1 of the drawings illustrates a first embodiment of the apparatus of the present invention for producing mesh film. An extrusion die means, including extrusion die 10, extrudes a tube 12 of a heat plastified, resinous, mesh film material, such as for example a polyethylene film. The extruded tube 12 moves generally upward, as seen in FIG. 1, past a first cooling means 14 which is located centrally within the extruded tube 12 to cool the internal surface of the tube 12. The first cooling means 14 has an outer diameter substantially equal to the inner diameter of the extruded tube 12.

A plurality of cooling nozzles 16 and 18 are disposed radially outward from the first cooling means 14, and direct a plurality of streams of cooling gas toward the exterior surface of the extruded tube. Cooling nozzles 16 are arranged in a circle around the tube 12 and extend radially inward from an annular element 20 defining an air passage 22. In similar fashion, nozzles 18 are arranged in a circle around the tube 12 and extend radially inward from an annular defining an air passage 26.

A support ring 28 surrounds annular elements 20 and 24 while permitting them to rotate freely. Ring 28 receives air under pressure via conduits 30 and 32 and supplies the air through internal passages (not shown) to air passages 20 and 26 via openings in the annular elements (not shown). Ring elements 20 and 24 may be freely rotated circumferentially around the tube 12 in the same, or in opposite directions.

The first cooling means 14 includes a generally cylindrical water cooled mandrel 34 and a pair of generally cylindrical gas bearings 36 and 38, which are positioned on either side of the mandrel 34 and which are axially aligned with the mandrel. The gas bearings 36 and 38, of conventional design, provide a thin cushion of air over which the tube 12 passes without appreciable drag.

It will be appreciated that the surface of the extruded tube 12 is selectively contacted by the air streams from nozzles 16 and 18 so as to form a plurality of narrow strips where the film is cooled. As may be appreciated, selective cooling raises the melt tension of the material in the cooled areas so that the film does not stretch as much during a subsequent film stretching operation as the adjacent warmer film areas. As a result of this higher melt tension, sharp ridges are formed in the film. If nozzles 16 and 18 are caused to rotate in opposite directions around the tube 12, a criss-cross ridge pattern is produced, providing substantially increased mechanical film toughness. An appropriate motor drive mechanism (not shown) of conventional design may be provided for the purpose of rotating annular elements 20 and 24, if desired.

Enlargement or stretching of the tube 12 occurs after passage of the tube 12 through an annular gas bearing 40 which is spaced axially from the first cooling means 14. This permits the diameter of the extruded tube 12 to be increased subsequently by means of a trapped air bubble, indicated generally at 42, within the enlarged section 44 of the extruded tube, while keeping the tube 12 in proper position between nozzles 16 and 18 and cooling means 14. As illustrated, enlargement of the tube in section 44 may be effected to various diameters, as desired. This enlargement process is accomplished in a conventional manner.

A second cooling means 46 may be provided for cooling the tube 12 after it passes through the annular gas bearing 40. This cooling means may include means for directing a cooling gas against the exterior surface of the extruded tube as it is enlarged. In similar fashion, a third cooling means, indicated at 48, may be provided for cooling the tube 12 after it emerges from the die means. The third cooling means may also comprise means for directing a cooling gas against the exterior surface of the extruded tube. Preferably, the second and third cooling means 46 and 48 direct a generally even flow of air toward the surface of the tube 12 or section 44 in order to ensure that differential cooling of the film is not effected.

An indicated previously, the external gas bearing 40 makes it possible to inflate the extruded tube 12 in the section 44 beyond the bearing 40 to various desired diameters, as shown by the dashed line and solid line representations of section 44. Thus, with a die 10 which provides a tube 12 having a specific diameter, the tube 12 may be expanded in the section 44, for example, by factors ranging from 1.5:1 up to 3:1, and above. The expansion ratio selected will, of course, depend a number of factors, including the specific mesh film material being utilized and the application for the film produced.

As may be noted from FIG. 1, the water cooled mandrel 34 is slightly smaller in diameter than either of the gas bearings 36 and 38, although this difference is exaggerated slightly in the drawing for purposes of clarity. Preferably, the mandrel 34 has a low friction exterior surface. The air from nozzles 16 and 18 brings the film of tube 12 into close proximity to the surface of the mandrel 34 so as to enhance further the cooling of those portions of the tube against which the air is directed, producing sharper ridges and permitting higher extrusion rates.

Figure 2:
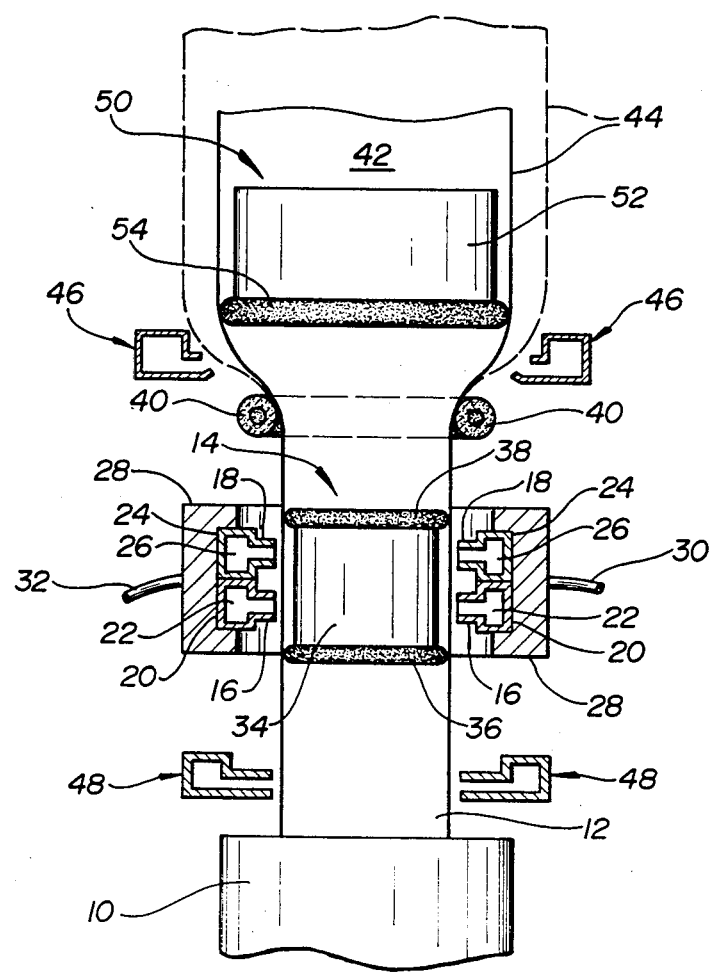
FIG. 2 is a side view of a second embodiment of the present invention, with portions broken away and in section.

Reference is now made to FIG. 2 which illustrates a second embodiment of the present invention. The apparatus shown in FIG. 2 is similar in many respects to that of FIG. 1 and, accordingly, like structures have been given corresponding reference numerals, and need not be described further. The embodiment of FIG. 2 differs from that of FIG. 1, however, in that it includes a fourth cooling means 50, centrally located within the extruded tube 12 and, specifically, within the expanded or enlarged section 44 of the tube, for cooling the internal surface of the tube after the tube emerges from the annular gas bearing 40. As may be note, the outer diameter of the fourth cooling means 50 is substantially greater than the inner diameter of the annular gas bearing 40.

The fourth cooling means 50 comprises a mandrel 52, which may be water-cooled, and a gas bearing 54 associated therewith. The mandrel 52 is used when producing the smallest size tube section 44, indicated in solid lines, with the larger sizes, as indicated in dashed lines, not being cooled by the mandrel 52. This allows higher production rates when the smallest size expanded mesh film tube is produced, while retaining the ability to produce larger sizes of mesh film tube without the necessity of equipment changes. If desired, an airbox (not shown) may be provided surrounding the mandrel 52 when the smallest size tube is produced to urge the tube against the mandrel 52. Such an airbox is constructed in two semi-circular sections to facilitate removal when larger sizes of mesh film tube are to be produced. Alternatively, fourth cooling means 50 may comprise a gas bearing 54 alone without a mandrel 52 associated therewith.

Figure 3:
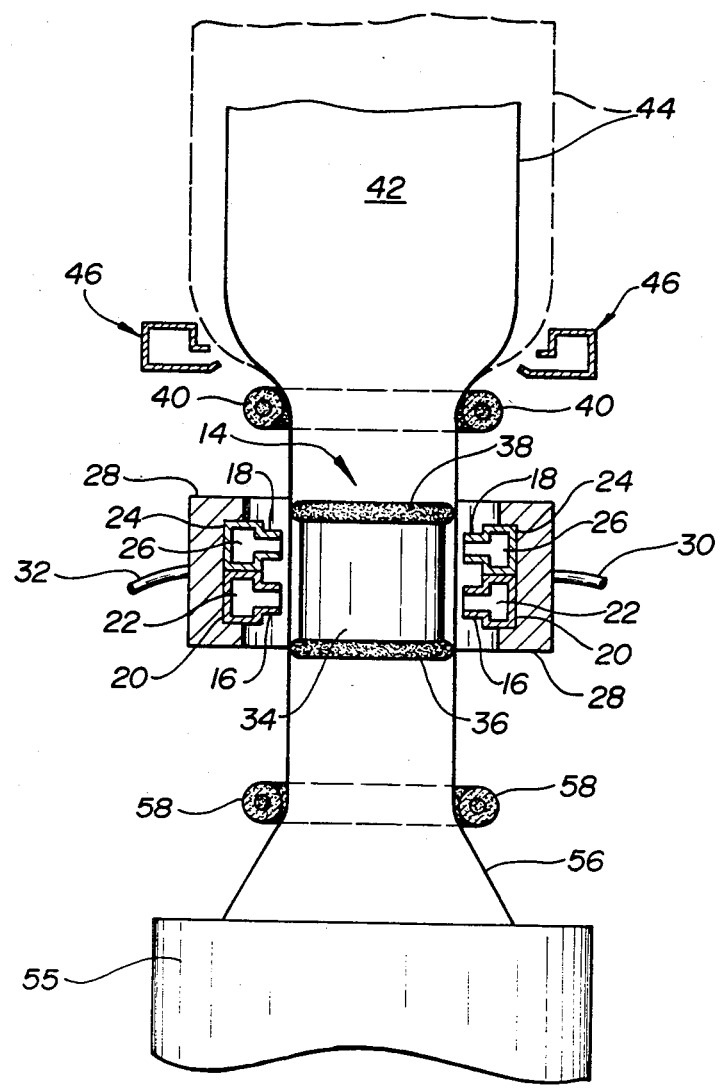
FIG. 3 is a side view of a third embodiment of the present invention, with portions broken away and in section.

FIG. 3 of the drawings illustrates a third embodiment of the present invention. Many of the components are similar to those shown in FIGS. 1 and 2 and, therefore, have been given corresponding reference numerals. The embodiment of FIG. 3 differs from the embodiments of FIG. 1 and 2, however, in that the extrusion die means comprises an extrusion die 55 which produces a relatively large diameter tube 56 of a heat-plastified, resinous, mesh film material. The extrusion die means further includes a second annular gas bearing 58, adjacent the die 55 and coaxially aligned therewith. The second annular gas bearing 58 receives the tube 56 therethrough from the extrusion die 55. The bearing 58 has an inner diameter which is less than the diameter of the tube 56 as it leaves the die 55, and which is substantially equal to the outer diameter of the first cooling means 14. The tube 56 is reduced in diameter by stretching the tube between the die 55 and the gas bearing 58.

As a result of the substantially larger die 55, lower pressures and lower melt temperatures are experienced by the mesh film material for any given extrusion rate than is the case with the previously described embodiments. As a consequence, the configuration of FIG. 3 has a higher production capability. If desired, a further cooling means, similar to means 48 in FIG. 1, may be provided adjacent the die 55 in the embodiment of FIG. 3. By varying the amount of cooling provided, the amount of retained orientation of the film material in the direction of extrusion can be varied to achieve optimum properties for a given application. An external airbox may also be positioned surrounding the tube 56 to minimize pressure differences between the inside and outside of the tube 56.

In some instances, it may be desired to simplify the apparatus of FIGS. 1–3 by replacing the mandrel 34 and associated gas bearings 36 and 38 with a single larger gas bearing of approximately the same length. It will be appreciated, however, that this will result in reduced cooling capability and a corresponding reduction in attainable extrusion rates. It will be further appreciated that a number of other variations may be made in the apparatus of FIGS. 1–3 within the scope of the present invention. For example, the fourth cooling means 50 of FIG. 2 may, if desired, be incorporated into the apparatus of FIGS. 1 and 3. The apparatus and method of the present invention may be utilized with a great many different materials which are capable of being heat plastified and extruded as a film.

Having described the invention in detail and by reference to preferred embodiments thereof, it will be apparent that modifications and variations are possible without departing from the scope of the invention defined in the appended claims.

What is claimed is:

1. Apparatus for producing mesh film, comprising:
   extrusion die means for extruding a tube of a heat-plastified, resinous, mesh film material,
   first cooling means, centrally located within the extruded tube, for cooling the internal surface of said tube, said first cooling means having an outer diameter substantially equal to the inner diameter of said extruded tube,
   a plurality of cooling nozzles, disposed radially outward from said first cooling means, for directing a plurality of streams of a cooling gas toward the exterior surface of said extruded tube, and
   an annular gas bearing spaced axially from said first cooling means such that said extruded tube passes therethrough after leaving said first cooling means, thereby permitting the diameter of said extruded tube to be increased subsequently by means of a trapped air bubble therewithin.

2. The apparatus of claim 1 in which said first cooling means comprises:
   a generally cylindrical cooled mandrel, and
   a pair of generally cylindrical gas bearings positioned on either side of said mandrel and axially aligned therewith.

3. The apparatus of claim 1 in which at least some of said plurality of cooling nozzles are movable circumferentially around said extruded tube.

4. The apparatus of claim 1 further comprising second cooling means for cooling said tube, after it passes through said annular gas bearing, as the diameter of said tube is enlarged.

5. The apparatus of claim 4 in which said second cooling means comprises means for directing a cooling gas against the exterior surface of said extruded tube.

6. The apparatus of claim 1 further comprising third cooling means for cooling said tube as it emerges from said die means.

7. The apparatus of claim 6 in which said third cooling means comprises means for directing a cooling gas against the exterior surface of said extruded tube immediately after it emerges from the die means.

8. The apparatus of claim 1 further comprising fourth cooling means, centrally located within said extruded tube, for cooling the internal surface of said tube after said tube emerges from said annular gas bearing.

9. The apparatus of claim 8 in which the outer diameter of said fourth cooling means is substantially greater than the inner diameter of said annular gas bearing.

10. The apparatus of claim 8 in which said fourth cooling means is selected from the group consisting of a cooled mandrel, a gas bearing, and combinations thereof.

11. The apparatus of claim 1 in which said first cooling means comprises a generally cylindrical gas bearing.

12. The apparatus of claim 1 in which said extrusion die means comprises:
    an extrusion die for extruding a relatively large diameter tube of a heat-plastified, resinous, mesh film material, and
    a second annular gas bearing, adjacent said die and coaxially aligned therewith, for receiving said tube therethrough from said extrusion die, said second annular gas bearing having an inner diameter which is less than the diameter of said tube as it leaves said die and substantially equal to the outer diameter of said first cooling means.

13. A method for producing mesh film, comprising the steps of:
    extruding a heat-plastified, resinous, mesh film material to form a tube of mesh film material,
    passing said tube of mesh film material over a centrally located generally cylindrical cooling means to cool the internal surface of said tube while directing a plurality of streams of cooling gas toward the exterior surface of said tube,
    thereafter, passing said tube through an annular gas bearing having an inner diameter approximately equal to the outer diameter of said cooling means, and
    thereafter, increasing the diameter of said tube by means of a trapped air bubble therewithin.

14. The method of claim 13 in which said cooling means comprises:
    a generally cylindrical cooled mandrel, and
    a pair of generally cylindrical gas bearings positioned on either side of said mandrel and axially aligned therewith.

15. The method of claim 13 in which at least some of said streams of cooling gas are moved circumferentially around said extruded tube.

16. The method of claim 13 further comprising the step of cooling said tube as its diameter is increased by directing a cooling gas against its exterior surface.

17. The method of claim 13 further comprising the step of cooling said tube immediately after it is extruded by directing a cooling gas against its exterior surface.

18. The method of claim 13 further comprising the step of cooling said tube after its diameter is increased by means selected from the group consisting of a cooled mandrel, a gas bearing, and combinations thereof positioned within said tube.

19. The method of claim 13 in which said cooling means comprises a generally cylindrical gas bearing.

20. The method of claim 13 in which said step of extruding a heat-plastified, resinous, mesh film material to form a tube of mesh film material comprises the steps of:
    extruding a relatively large diameter tube of a heat-plastified, resinous, mesh film material, and
    reducing the diameter of said relatively large diameter tube by stretching said tube axially.

* * * * *

UNITED STATES PATENT AND TRADEMARK OFFICE
CERTIFICATE OF CORRECTION

PATENT NO. : 4,732,727

DATED : March 22, 1988

INVENTOR(S) : Carl B. Havens

It is certified that error appears in the above-identified patent and that said Letters Patent is hereby corrected as shown below:

Cover Page, [22] Files, "Apr. 3, 9186" should read --Apr. 3, 1986--.

Col. 1, line 28, following the word "film" insert therefore --,--.

Col. 8, line 26, following the word "by" insert therefore --a--.

Signed and Sealed this

Twenty-fourth Day of January, 1989

Attest:

DONALD J. QUIGG

*Attesting Officer*  *Commissioner of Patents and Trademarks*